No. 846,875. PATENTED MAR. 12, 1907.
A. TINDEL.
CHUCK MECHANISM.
APPLICATION FILED NOV. 27, 1905.

WITNESSES:

INVENTOR

BY

ATTORNEY.

UNITED STATES PATENT OFFICE.

ADAM TINDEL, OF PHILADELPHIA, PENNSYLVANIA, ASSIGNOR TO TINDEL MORRIS COMPANY, OF EDDYSTONE, PENNSYLVANIA, A CORPORATION OF PENNSYLVANIA.

CHUCK MECHANISM.

No. 846,875.

Specification of Letters Patent.

Patented March 12, 1907.

Application filed November 27, 1905. Serial No. 289,362.

*To all whom it may concern:*

Be it known that I, ADAM TINDEL, a citizen of the United States, and a resident of Philadelphia, in the county of Philadelphia and State of Pennsylvania, have invented certain Improvements in Chuck Mechanism, of which the following is a specification.

This invention is an improved chuck mechanism designed particularly for holding crank-shafts and centering crank-pins in turning-lathes, so that the shaft ends can be firmly held against movement or vibration and pins angularly disposed on the shaft can be revolved into the central position required for turning them, the special features of construction overcoming the difficulties heretofore found in satisfactorily centering and holding crank-shaft pins for turning them in contact with a cutting or reducing tool.

Figure 2:
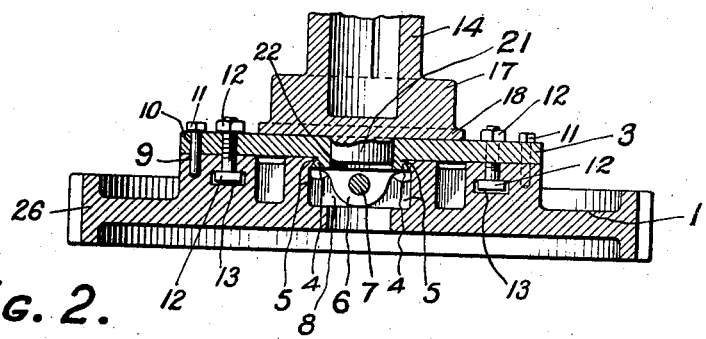
Figure 1:
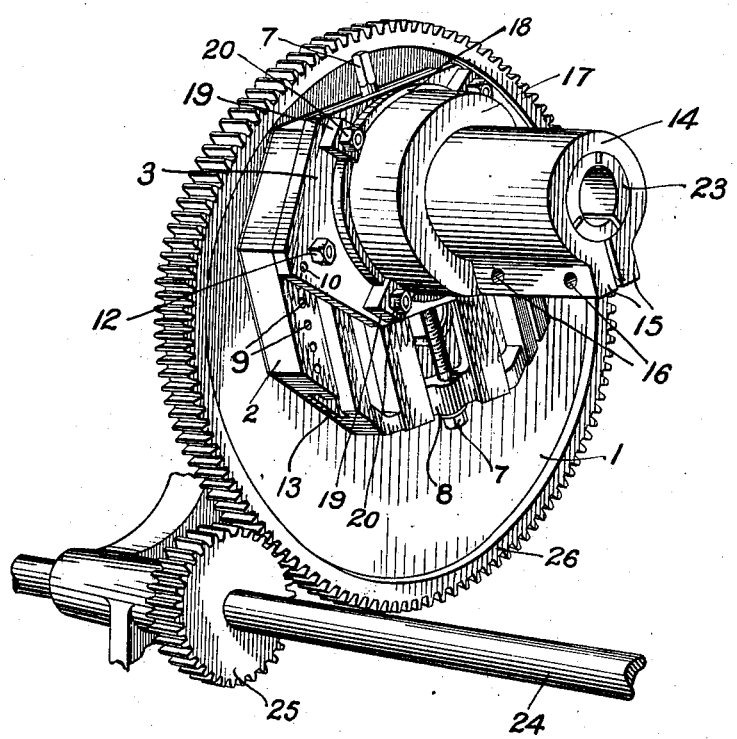

In the accompanying drawings, Figure 1 represents a perspective view of a lathe face-plate having my improved chuck mechanism applied thereto, and Fig. 2 represents a central transverse sectional view therewith with part broken away.

As shown in the drawings, in its preferred form the invention comprises the face-plate 1, having the base 2 formed integrally therewith. On the base is movably supported a slide or carriage 3, having a dovetail guide 4, which runs in the undercut or dovetail way 5, formed in the base and diametrically disposed with reference to the face-plate. A lug 6, secured to the slide and disposed in the way 5, is engaged by a screw 7, journaled in bearings 8, by which the slide may be adjusted longitudinally to the position desired with reference to the center of the face-plate 1. Holes 9 in the base extending parallel to the way 5 are disposed at graduated distances from the center, and the holes 10 in the slide are brought into registration therewith by the operation of the screw, upon which dowel-pins 11 are inserted to hold the slide in the desired position. The slide is secured immovably in the position to which it is adjusted by bolts 12, which pass therethrough and run in the ways 13 of the base parallel to the way 5, the ways 13 being undercut to engage the bolt-heads.

A chuck comprising the split sleeve 14, having the flanges 15 with the holes 16 therethrough, and the base 17, having thereon the circular flange or ring 18, to which the sleeve is integrally connected, is held to the slide by clips 19, engaged to the slide by bolts 20, which are released to permit the chuck to be turned and drawn up to fix it. the chuck being centered by a centrally-disposed cylindrical boss 21 thereon which revolves in a corresponding socket 22 in the slide movable in a plane passing through the center of the face-plate.

In the sleeve 14 is a split bushing 23, into which the end of the shaft to be operated upon is inserted, and thereby gripped by drawing together the flanges 15.

The slide having been moved and fixed so as to fix the center of the chuck at the proper distance from the center of the lathe for centering the crank-pin to be turned and the chuck fixed to the carriage by the clamps or clips 19 after having been turned so as to center the pin, the face-plate is revolved to revolve the crank-shaft by the revolving shaft 24, having the pinion 25 fixed thereon, which engages the gear 26 of the face-plate.

Having described my invention, I claim—

1. A chuck mechanism comprising, in combination with a face-plate having guiding means thereon, a slide with guiding means engaging the guiding means of said face-plate, a chuck carried by said slide and having a circular flange thereon, and means for clamping said flange to said slide.

2. A chuck mechanism comprising a face-plate having a base formed integrally therewith and projecting therefrom, said base having longitudinal guiding means, a slide mounted on said base and having guiding means engaging the guiding means of said base, means for adjusting and means for fixing said slide relative to said base, a split sleeve supported by said slide so that it can be turned relatively thereto, said sleeve having a circular base-flange thereon, and means for clamping said flange to said slide.

In testimony whereof I have hereunto set my hand, this 24th day of November, 1905, in the presence of the subscribing witnesses.

ADAM TINDEL.

Witnesses:
L. I. MORRIS,
W. ELLIOTT HAZZARD.